United States Patent [19]

Engdahl et al.

[11] 3,740,592
[45] June 19, 1973

[54] THERMIONIC CONVERTER
[75] Inventors: Richard E. Engdahl, Danbury, Conn.; John R. Bedell, North Salem, N.Y.
[73] Assignee: Energy Research Corporation, Bethel, Conn.
[22] Filed: Nov. 12, 1970
[21] Appl. No.: 88,953

[52] U.S. Cl. ............... 310/4, 165/104, 165/185
[51] Int. Cl. ................................... H01j 45/00
[58] Field of Search ............... 310/4; 29/592; 164/46; 117/47 H, 106; 165/104, 105, 81, 185

[56] References Cited
UNITED STATES PATENTS

| | | | |
|---|---|---|---|
| 3,322,979 | 5/1967 | Clendinning et al. | 310/4 |
| 3,329,839 | 7/1967 | Devin | 310/4 |
| 3,426,220 | 2/1969 | Block et al. | 310/4 |
| 2,595,150 | 4/1952 | Lemeshka | 165/104 X |
| 2,578,917 | 12/1951 | Bisch | 165/104 |
| 3,223,858 | 12/1965 | Martini | 310/4 |
| 3,330,974 | 7/1967 | Wilson | 310/4 |
| 3,369,922 | 2/1968 | Svrchek | 117/47 H |
| 3,496,010 | 2/1970 | Bracken et al. | 117/66 |

*Primary Examiner*—D. F. Duggan
*Attorney*—Mason, Kolehmainen, Rathburn & Wyss

[57] ABSTRACT

A thermionic converter is provided in which a protective silicon carbide shell is provided around the refractory metal emitter of the converter to shield it from the hot gases of a fossil fuel heat source and prevent oxidation of the emitter. The silicon carbide shell is spaced from the emitter so that stresses are not set up which would cause crackling or breaking of the shell. Heat transfer between the protective shell and the emitter is effected by means of a metal conductor which is liquid at the operating temperature of the converter. To obtain a long-life unit the silicon carbide shell is formed by uniformly depositing silicon carbide on the outer surface of a rotating, heated graphite mandrel.

17 Claims, 4 Drawing Figures

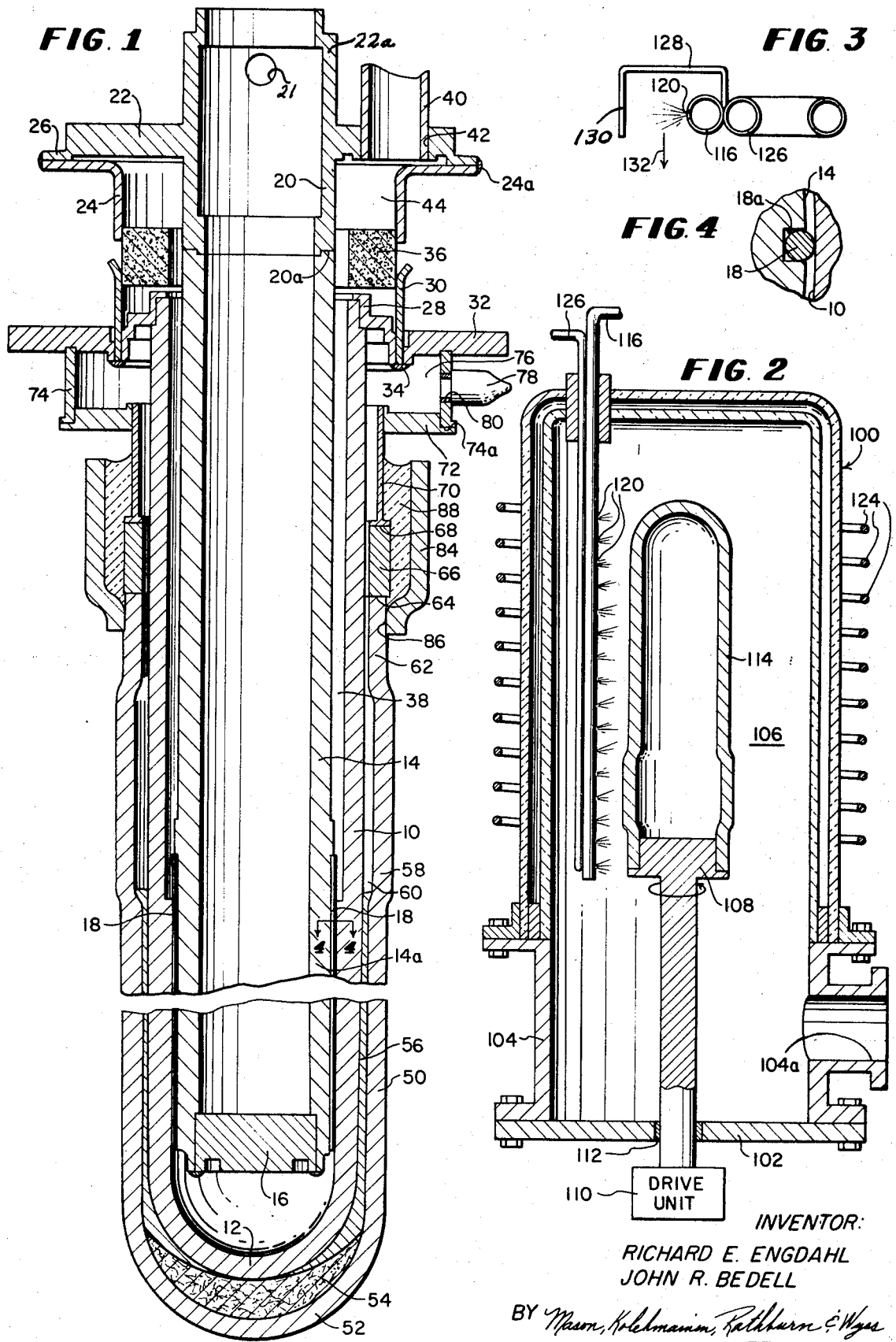

THERMIONIC CONVERTER

The present invention relates to thermionic converters, of the type wherein the heat differential between spaced emitter and collector electrodes causes electron emission from the relatively hot emitter to the relatively cool collector thus establishing current flow therebetween and the direct conversion of heat energy into electrical energy. Specifically, the present invention relates to thermionic converters of the above-described type wherein cesium vapor is employed to reduce the work functions of the emitter and collector so that a large flow of electrons between emitter and collector is accomplished. It is a specific object of the present invention to provide a thermionic converter of the cesium vapor type having high efficiency and long life characteristics when heated by the hot gases from fossil fuel heat sources.

While various arrangements have heretofore been proposed in the thermionic converter field for directly converting heat energy into electrical energy, these arrangements have in general had relatively short life spans which render them totally unsatisfactory for most commercial applications which require hundreds of hours of continuous operation. One of the primary problems in this field has been to provide a suitable arrangement for heating the emitter electrode of the thermionic converter to the extremely high temperatures necessary for efficient converter operation while protecting the emitter from the effects, such as oxidation, pitting and the like, of the hot gases of the extremely intense heat source which is required. If the emitter electrode is coated to provide a protective envelope the further problem arises that since the material of the emitter and the material of the envelope are of high modulus of elasticity, i.e., the stress one gets for a given deflection is very high, then any mismatches produced by strains and the like develop stresses which exceed the strength limit of the material and provide a destructive form of failure for the unit. Such an arrangement is, of course, entirely unsuitable from a commercial standpoint in which the heat sources and thermionic converters must be completely self-contained and safe for operating personnel, and the like.

It is, therefore, an important object of the present invention to provide a new and improved thermionic converter wherein a protective envelope or shell is provided for the emitter of the termionic converter to shield it against the deleterious effects of hot gases without developing undesired stresses in either the emitter or its protective shell. 8

It is another object of the present invention to provide a new and improved thermionic converter wherein a free standing protective shell is provided around the emitter electrode of the converter and good heat transfer characteristics are provided by means of a liquid metal conductor positioned between and extending along only a portion of the length of the emitter and protective shell combination.

It is still another object of the present invention to provide a new and improved thermionic converter wherein a protective shell surrounds the emitter electrode, a liquid metal conductor is provided between the protective shell and the emitter for efficient heat transmission, and a space of substantial volume is provided above this heat conductor to provide for expansion and contraction thereof without damage to the connecting means whereby the emitter and protective shell are joined together at their upper ends.

It is another object of the present invention to provide a new and improved thermionic converter wherein a protective shell surrounds the emitter electrode, a liquid metal conductor is provided between emitter and shell, and a cover gas which is noncondensing when the converter is inoperative, is provided in the space above this liquid conductor to minimize transport of the vapors of said liquid metal conductor into said space.

It is another object of the present invention to provide a new and improved method of forming a member of refractory material by chemical vapor deposition on a heated mandrel wherein a gas carrying the chemical constituents of the member is simultaneously directed to a plurality of different areas on the mandrel so that a layer of refractory material is built upon the mandrel which is of substantially uniform chemical balance in all portions of the layer.

It is a further object of the present invention to provide a new and improved method of forming a silicon carbide member by chemical vapor deposition on a heated mandrel wherein methyltrichlorosilane gas is simultaneously directed to a plurality of areas on the mandrel so that a layer of silicon carbide is built up on the mandrel which is substantially free from veins or localized deposits of either free silicon or free carbon.

The invention, both as to its organization and method of operation, together with further objects and advantages thereof, will best be understood by references to the following specification taken in connection with the accompanying drawings in which:

FIG. 1 is a fragmentary cross sectional view of a thermionic converter embodying the features of the present invention;

FIG. 2 is a cross sectional view of an apparatus employed in accordance with the present invention to form the protective silicon carbide shell of the converter of FIG. 1;

FIG. 3 is a sectional view of an alternative gas jet arrangement which may be employed in the apparatus of FIG. 2; and FIG. 4 is a fragmentary sectional view taken along the line 4—4 of FIG. 1.

Referring now to the drawings, and more particularly to FIG. 1, the thermionic converter of the present invention is therein illustrated as comprising an elongated cylindrical emitter electrode 10, made of suitable refractory metal such as tungsten and having a closed bottom end portion 12. Inside the emitter 10 is positioned an elongated cylindrical collector electrode 14 which is preferably made of copper plated with molybdenum, the collector 14 being provided with a copper end plug 16. The active portion 14a of the collector 14 is relatively closely spaced to the adjacent inner surface of the emitter 10, a plurality of sapphire rods 18 being positioned between the active portion 14a and the emitter 10 so that the adjacent surfaces of these electrodes are held apart at a spacing of approximately 0.010 inch. Specifically, the rods 18 are approximately 0.040 inch in diameter and are positioned in longitudinally extending grooves 18a (FIG. 4) formed in the collector 14 of the proper depth to space the emitter 10 the desired distance from the collector 14. The sapphire rods 18 act as insulators to maintain the collector 14 insulated from the emitter 10 while maintaining the desired spacing between these members with temperature variations. Since the members 10 and 14 are of relatively small diameter in relation to their lengths most of the expansion of these members is longitudinal and the desired spacing between collector and emitter is maintained over a wide range of temperature variation. The upper ends of the grooves 18a form shoulders against which the square cut upper ends of the sapphire rods 18 may abut as the collector 14 is inserted into the emitter 10 so that these rods are retained in the grooves 18a as the collector is inserted into the emitter. In this connection it will be understood that the active portion 14 a of the collector 14, although broken away in FIG. 1, is actually of a length many times its diameter so that a relatively large area is provided for electron flow between the heated emitter electrode 10 and the relatively cool collector electrode 14, as will be readily understood by those skilled in the art.

A nickel sleeve 20 is secured to the upper end of the collector electrode 14 by means of a suitable joint such as an electron beam weld at 20a, the sleeve 20 being provided with a horizontally extending annular flange portion 22 which acts as a collector lead for the thermionic converter, it being understood that a suitable output conductor may be connected to the flange 22 by any suitable cable connector arrangement. An inverted cup shaped member 24, also of nickel, is secured to the outer edge portion 26 of the flange 22. An annular support ring 28 is secured to the upper end of the tungsten emitter by means of a suitable copper brazing operation and a cylindrical sleeve 30 is secured between the bottom flange of the annular ring 28 and a horizontal annular flange member 32 which latter member acts as the main support member of the thermionic converter and also acts as the emitter lead of the converter to which electrical connection can be made by any suitable means. The members 28, 30 and 32 are secured together by means of a suitable weld 34 to provide a solid connection between these members at the operating temperature of the converter.

An annular ceramic sealing member 36, preferably of alumina, is secured to the flanges 24 and 30 by a suitable brazing peration so that the space 38 between the emitter and collector electrodes 10 and 14 is sealed off while at the same time these elctrodes are electrically insulated from one another. A diode evacuation tube 40 is positioned within an opening 42 in the flange 22 and may be attached to suitable evacuation apparatus during the assembly of the converter, as described hereinafter.

If the tungsten emitter were exposed directly to the hot gases of a fossil fuel heat source at the high temperatures needed to achieve reasonable efficiencies of thermionic conversion, this emitter would very rapidly deteriorate and disintegrate so that the useful life of the converter would be very short. Furthermore, if a protective shell of some material such as silicon carbide is coated on the outside of the emitter 10 to protect it from the deleterious effects of the hot gases, stresses may be set up in such coating which will result in cracking or breaking of the protective coating which again results in a relatively short-lived converter unit. Such cracking or stressing occurs because both the tungsten emitter and the silicon carbide coating are of high modulus of elasticity so that the stress for a given deflection is very high and mismatches due to strains or the like do not produce bending or yielding of the material but result in the destructive form of failure which cannot be permitted in a commercial unti which must develop the desired current output over long periods of time and without attendance.

In accordance with an important feature of the present invention, a free standing envelope or shell 50, which is formed of substantially pure silicon carbide by means of the particular forming method and apparatus to be described in more detail hereinafter, is positioned around the outside of the emitter 10, the protective envelope 50 also having a closed bottom end portion 52 within which is positioned a mass of graphited felt 54 which acts as a cushion against which the bottom end portion 12 of the emitter 10 can expand as the converter is brought to its operating temperature. The protective shell 50 is not physically connected to or supported on the outer surface of the emitter 10 but conduction of heat between the envelope 50 and the emitter 10 is accomplished by means of a metal conductor 56 which fills the space between the emitter 10 and the envelope 50 in the desired active area of the converter and is a liquid at the operating temperature of the converter. The conductor 56 is preferably of tin, which is molten at temperatures well below the operating temperature of the thermionic converter, and fills the entire space between the shell 50 and the emitter 10 down to the graphite felt cushion 54. While tin has been found to be most suitable for the liquid heat conductor 56, it will be understood that other materials such as bismuth, lead, indium, and others, having a low melting point, low vapor pressure at the operating temperature of the converter, and low solubility for the material of the protective shell 50 and emitter 10 may also be used. In this connection, it will also be understood that the emitter 10 is preferably made of tungsten of the type having a crystal orientation such as to provide good electron emission characteristics. Furthermore, the inner surface of the tungsten emitter 10 may be coated with any one of a number of materials to improve the electron emission characteristics thereof, as will be readily understood by those skilled in the art. For example, the inner surface of the tungsten emitter may be coated with rhenium or molybdenum to improve electron emission under certain conditions. Also, the emitter 10 may be made of a material other than tungsten which has good electron emission characteristics, such as molybdenum, rhenium, tantalum or columbium. However, in the case of tantalum and columbium, the inner surface of the emitter 10 should be coated with molybdenum, tungsten or rhenium to minimize reaction with the sapphire rods 18. Also, when materials such as molybdenum, rhenium, tantalum or columbium are used as the base material for the emitter 10, the outer surface of this emitter should be coated with tungsten to provide optimum compatibility with the tin heat conductor 56, or in some instances, this outer coating may be of molybdenum which also has a reasonable compatibility with the tin layer 56.

In accordance with a further important feature of the invention, the protective shell 50 is provided with an outwardly bulging portion 58 of larger diameter than the diameter of the main portion of the shell 50, the bulging portion 50 defining a space 60 which is of substantially larger volume oer unit length along the converter than the volume per unit length of the space between the shell 50 and emitter 10 in the active emitting area of this emitter. For example, the active emitter $SiO_2$ — 68 %
$PbO$ — 15 %
$Na_2O$ — 10 %
$K_2O$ — 6 %
$CaO$ — 1 %

The glass 88, which is essentially a liquid at the operating temperature of the converter, removes the necessity for an exact thermal expansion match and protects the tungsten sleeve 66 and the joints 64 and 68 from the atmosphere so that the tungsten 66 is not eaten away quickly as it would be by oxidation if exposed to the oxygen in the air. The joints 64 and 68 are likewise protected by the glass 88 from corrosion by exposure to oxygen. Furthermore, by positioning the glass 88 outside of the sleeve 70 and ring 66, the molten tin 56 is completely isolated from the low melting point glass 88 so that the tin cannot damage or destroy the sealing effect of the glass 88 on the joints 64 and 68. If the tin layer 56 were permitted to contact the glass 88, it could work up through the glass seal and destroy it. In addition, the glass 88, since it is a molten liquid at the operating temperature of the converter, has a self-healing characteristic which provides additional protection against seal destruction.

When the heat source is removed the tin layer 56 freezes and since it freezes at the top first it shrinks and pulls up leaving voids at the bottom. When the heat source is reapplied if the tin layer 56 should melt first at the bottom, the graphite felt 54 will absorb any expansion of the tin layer 56 as it melts in regions where there are no voids. Since the tin layer 56 does not wet the graphite filled felt 54 or fill the voids thereof, a substantial cushion volume is available for the expansion of the tin layer 56 as it melts.

Considering now the manner in which the thermionic converter described above is assembled and prepared for operation, the alumina sealing ring 36 is first secured to the members 24 and 30 as a subassembly. The member 28 is secured to the emitter 10 and the collector 14 with sleeve 20 attached is assembled into the emitter 10 with the sapphire rods 18 positioned within the grooves 18a, as described heretofore, and with the subassembly 24, 36, 30 in position. The member 74 is secured to the member 32 as a separate subassembly and the welds 34 and 24a are then made.

The envelope 50 and members 66, 70, 72, 84 and 88 are made as a separate subassembly. A predetermined amount of tin is placed in the shell 50 of this subassembly and is heated so that the tin becomes molten. As this is done an inert atmosphere of argon is introduced into the shell 50 to prevent the tin from oxidizing when in the molten state. The diode unit is then placed in the shell 50, under an inert atmosphere of argon through the tube 78, and while the tin is still molten and the diode unit is pushed downwardly until the members 74 and 72 are at their final adjoining positions whereupon the diode unit is removed from the shell 50 and the level of the tin which coats the outer surface of the emitter 10 is noted. If the level of the tin 56 is too great, the amount of tin within the shell 50 is then changed so that the level of the tin within the shell 50 when the diode unit is inserted is just in the vicinity of the bottom portion of the space 60, as shown in FIG. 1. The diode unit is then reinserted into the shell 50, as described above, and the members 74 and 72 are welded together at 74a while purging with argon gas through the tube 78. The pressure of the argon cover gas is then adjusted by means of a suitable valve connected to the tube 78 so that the pressure within the chamber 60 is equal to or slightly greater than atmospheric pressure and this valve is then closed.

The unit is then placed in a suitable heat source so that the outer surface of the shell is run at a temperature slightly higher than the normal running temperature of 2,550°F and the unit is run for a length of time after evacuation apparatus has been connected to the tube 40 so as to exhaust the gases which are given off by the surfaces of the emitter 10 and the collector 14 as these surfaces are heated. The chamber 44 and space 38 are exhausted to a pressure of $10^{-8}$ torr. and after this degassing operation a metal tube containing a glass capsule of cesium is pinched so that the glass capsule is broken and cesium vapor is introduced into the chamber 44 and the space 38 through the tube 40. This cesium vapor tube is positioned in a suitable reservoir which communicates with the chamber 44 through a suitable screen to prevent pieces of the glass capsule which has been broken from entering the chamber 44. The unit is then cooled off so that the cesium becomes a solid and the space 44, 38 is again evacuated to the desired pressure after which the evacuation tube 40 beyond the cesium source is permanently sealed off and the evacuation apparatus is disconnected. During the degassing operation the pressure of the argon gas in the chamber 76 is readjusted to atmospheric pressure or slightly positive by opening the valve connected to the tube 78, after which the tube 78 is pinched off.

The protective silicon carbide shell 50 is directly exposed to the hot gases of the fossil fuel heat source which direct heat at the active portion of the emitter 10 and collector 14 by any suitable reflector arrangement so that the outer surface of the shell 50 in the active emitter-collector region is normally at an operating temperature of 2,550°F. At this extremely high operating temperature, the shell 50 cannot have veins or zones of either free carbon or free silicon, i.e. uncombined as silicon carbide, since the carbon would oxidize out and form a porous structure which would quickly crack or break under repeated or prolonged heat cycles and the silicon regions would oxidize to a weak viscous structure lacking mechanical strength, thereby also permitting shell failure. In accordance with a further important feature of the invention, the protective shell 50 is formed by a chemical vapor deposition method which employs the apparatus shown in FIG. 2 so that a silicon carbide shell 50 of uniform chemical balance is provided which is free from agglomerates and veins of either free carbon or free silicon with the result that an extremely long life protective shell is produced. Referring to FIG. 2, a double walled chamber 100 is provided, which is supported on a tee-shaped conduit 104 one end of which is sealed by means of a closure member 102 so that the space 106 within the vessel 100 may be continuously evacuated to an absolute pressure of 10 inches of mercury prior to and during the forming operation by means of any suitable evacuation apparatus connected to the tee opening 104a. At the center of the chamber 106 there is provided a rotating platform 108 which is driven from an external drive unit 110 through a rotating joint 112 so that the platform 108 rotates approximately one revolution per second. A hollow thin walled graphite mandrel 114 of a form corresponding to the shell 50 of FIG. 1 is positioned on area spacing may be .015 inch and the spacing between the members 10 and 50 in the region 60 may be 0.050 inch. With such an arrangement the heat conducting tin 56, which expands as the converter is brought from room temperature to an operating temperature of approximately 2,550°F. has the relatively large space 60 into which it may expand. The expansion chamber 60 is preferably of sufficient volume that the upper level of the molten tin 56 does not rise sufficiently high to cause damage to the supporting members and seals used to support the free standing envelope 50, even when the converter is tilted a substantial angle from the vertical. If, on the other hand, the spacing between the shell 50 and emitter 10 were of relatively small dimensions all the way to the top of the shell 50, the level of the tin 56 would change greatly when heated to the operating temperature of the converter, or when tilted, and could cause severe damage to the joints of the supportint apparatus, thereby greatly lessening the life of the converter. Perferably, the level of the tin 56 rises only slightly into the volume 60 when changing from room temperature to the operating temperature of the converter. Furthermore, the collector 14 is perferably cooled by any suitable cooling arrangement such as a water pipe, which is introduced inside of the collector 14 and is concentric with an outer stainless steel water jacket, which is spaced from the inner surface of the collector 14 by a few thousandths of an inch. Water flows downwardly through this pipe out through the open bottom end thereof and upwardly within the water jacket close to the adjacent inner wall of the collector 14. In order to maintain the temperature of the collector 14 at the correct value during operation the water jacket is sealed to the upper end of the sleeve portion 22a of the flange 22 and helium is introduced through the opening 21 in the sleeve portion 22a so that it fills the space between the water jacket and the inner surface of the collector 14. The pressure of the helium in this space is adjusted to control the flow of the heat through this space to the water cooled stainless steel jacket so that the temperature of the collector 14 is maintained at approximately 1,000°F during operation of the converter.

As stated heretofore, the envelope 50 is supported independently of the emitter 10 and the molten tin layer 56 is employed for efficient heat transmission from the shell 50 to the tungsten emitter 10. More particularly, the upper end portion 62 of the silicon carbide shell 50 is secured by a brazed joint 64 to a tungsten sealing ring 66 the upper edge of which is secured by a brazed joint 68 to a nickel sleeve 70. The tungsten ring 66 is employed because its temperature coefficient of expansion is sufficiently close to that of silicon carbide that a solid supporting joint 64 can be made to the upper end of the shell 50. While the ring 66 and sleeve 70 have different temperature coefficients of expansion, since the nickel sleeve 70 is ductile it can yield to seal 68 and accommodate the different expansion rates to provide a seal which will withstand the high operating temperature of the converter without failing. It ha been found that the brazed joint 64 may be made in such manner as to withstand several hundred hours to high temperature operation by employing a brazing alloy having a composition of 80 percent silver, 3.7 percent titanium, 5.1 percent copper, 5.4 percent zinc and 5.8 percent cadmium. This brazing alloy may also be used to form the joint 86.

A radially extending flange member 72, also of nickel, is secured to the sleeve 70 at the upper end thereof and a nickel sleeve 74 of larger diameter is secured to the outer edge of the flange 72 by means of a suitable welding operation, so as to form a chamber 76 which is of substantially larger volume than that of the space between the shell 50 and emitter 10 along the length of these members. In accordance with a further important aspect of the invention, the chamber 76 and the entire space between the emitter 10 and the sleeve 70, ring 66 and protective shell 50 down to the level of the tin 56 is filled with a suitable inert cover gas which is introduced into the chamber 76 through a tube 78 which communicates with the chamber 76 through an opening 80 in the sleeve 74. Preferably, this cover gas is argon which has lower molecular and thermal diffusion than helium. However, helium or other inert gas may in some instances be used.

The tube 78 is used to introduce the cover gas into the chamber 76 and the space between the shell 50 and the emitter 10 by any suitable means and is then pinched off to seal the chamber 76. The argon gas within the chamber 76 is noncondensing at storage temperatures and remains in a gaseous state when the thermionic converter is brought to its operating temperature, so that this gas which is positioned on top of the molten tin layer 56 reduces the transport rate at which vapors from the molten tin layer 56 may rise and condense on the joints 64 and 68. Condensation of the tin vapors onto the joints 64 and 68 is objectionable because the tin tends to alloy with the brazed joints 64 and 68 and lower the melting point thereof so that these joints are weakened and destroyed.

Since the volume of the chamber 76 constitutes the major portion of the volume occupied by the cover gas, the pressure established by the cover gas remains relatively constant over a wide range of active emitter temperatures. This is because a relatively small amount of the gas is near the active emitter region where these wide temperature changes occur.

As stated heretofore, the level of the tin heat-transfer layer 56 is terminated at the upper end of the active area of the emitter 10 and collector 14. Accordingly, even though the actively emitting portion of the emitter 10 is operating at a temperature of approximately 2550°F. the operating temperature of the emitter 10 reduces rapidly as one moves upwardly away from the upper level of the tin 56 so that the operating temperature in the vicinity of the seal 64, 68 is approximately 1,100°F. However, even at a temperature of 1,100°F. the tungsten ring 66 would tend to oxidize and evaporate rapidly if it were exposed directly to the atmosphere. On the other hand, the silicon carbide shell 50 is difficult to support, and the tungsten supporting ring 66 is necessary to obtain a suitably rigid physical supporting joint 64 for the shell 50. In order to resolve these conflicting requirements, a cup-shaped silicon carbide sleeve 84 is secured to the upper end portion 62 of the shell 50 by means of a suitable brazed joint 86 and the space between the sleeve 84 and the ring 66 and sleeve 70 is filled with a low melting point glass 88. For example, the glass 88 may comprise a suitable lead glass having the following composition:

In order to provide an even more uniform distribution of the gas emitted from the tube 116, a deflector member 128 (FIG. 3) may be positioned to surround the tube 116 in the area of the jet openings 120, the shield 128 being secured along the length of the joined portion of the tubes 116 and 126 by any suitable means such as brazing, or the like. The shield 128 is provided with a right-angled end portion 130 which deflects the gas issuing from the jets 120 so that a broad sheet of gas issues in he direction of the arrow 132 and strikes the rotating mandrel 114.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a thermionic converter, the combination of a heat source, an emitter, a cooled collector closely adjacent said emitter in a predetermined active area, a silicon carbide protective member between said heat source and said emitter, means for mechanically supporting said silicon carbide protective member in spaced relation to said emitter so as to permit relative expansion and contraction between said protective member and said emitter, and means thermally connecting said protective member to said emitter in said active area, said thermal connecting means substantially filling the space between said protective member and said emitter in said active area and being liquid at the operating temperature of said converter.

2. The combination of claim 1, wherein said thermal connecting means is tin.

3. The combination of claim 1, wherein the space between said protective member and said emitter is of increased thickness beyond the active area of said emitter so that thermal expansion of said thermal connecting means does not substantially change the liquid level thereof.

4. In a thermionic converter, the combination of, a heat source, a cylindrical emitter, a cylindrical protective member concentric with said emitter and positioned between said heat source and said emitter, a heat conducting material positioned between said emitter and said protective member, said material being a solid at room temperature and becoming a heat transferring liquid at the operating temperature of the converter, and means for preventing damage to said protective member due to thermal expansion of said material.

5. The combination of claim 4, wherein said material is tin.

6. The combination of claim 4, wherein said protective member is positioned around said emitter and has a closed end portion into which said material flows when liquid, and a layer of fibrous heat resistant material positioned in said closed end portion which accommodates expansion of said heat conducting material without cracking said protective member.

7. In a thermionic converter, the combination of, a heat source, a cylindrical emitter, a cylindrical protective member concentric with said emitter and positioned between said heat source and said emitter, a heat conducting material positioned between said emitter and said protective member for a portion of the length thereof, said material being a solid at room temperature and a heat transferring liquid at the operating temperature of the converter, and a cover gas in the space between said emitter and said protective member not occupied by said heat conducting material, said gas inhibiting the transport of vapors of said heat conducting material through said space.

8. The combination of claim 7, wherein said heat conducting material is tin.

9. The combination of claim 7, wherein said gas is argon.

10. The combination of claim 7, wherein said emitter and said protective member are joined together in one region of said space and said cover gas minimizes the condensation of vapors of said heat conductive material on said joint.

11. In a thermionic converter, the combination of, a heat source, a cylindrical emitter, a cylindrical protective member concentric with said emitter and positioned between said heat source and said emitter, a heat conducting material positioned between said emitter and said protective member for a portion of the length thereof, said material being a solid at room temperature and a heat transferring liquid at the operating temperature of the converter, means connecting said emitter and said protective member together adjacent one end thereof, said heat conducting material tending to vaporize at the operating temperature of the converter, and means for preventing vapors of said heat conductive material from condensing on said connecting means.

12. The combination of claim 11, wherein said last named means is a gas which does not condense at normal room temperature.

13. In a thermionic converter, the combination, of a tubular protective member positioned vertically and having a closed bottom end, a cylindrical emitter positioned inside said protective member and spaced therefrom, a heat conducting material positioned in the space between said emitter and said protective member, means joining said protective member to said emitter at the upper end thereof, and means for protecting said joint from oxidation due to exposure to the atmosphere.

14. In a thermionic converter, the combination of, a tubular protective member of silicon carbide, a cylindrical emitter of tungsten positioned inside said protective member and spaced therefrom, a heat conducting material positioned in the space between said emitter and said protective member, a tungsten ring connected to the upper end of said protective member, and a glass seal covering the joint between said ring and said protective member, thereby to protect said joint from oxidation due to exposure to the atmosphere.

15. The combination of claim 14, wherein said glass is a lead glass which is essentially a liquid at the operating temperature of said converter.

16. In a thermionic converter, the combination of, a tubular protective member of silicon carbide, a cylindrical emitter of tungsten positioned inside said protective member and spaced therefrom, a heat conducting material positioned in the space between said emitter and said protective member, a nickel supporting sleeve, a tungsten ring connected between said sleeve and the upper end of said protective member to support the same, and a glass seal covering said tungsten ring to the rotating platform 108. A tube 116 extends through a sealing member 118 in the top wall of the vessel 100 and is provided with a series of openings 120 in the wall of the tube 116 facing the mandrel 114. Preferably the holes 120 are of approximately 0.020 inch diameter and are spaced one-fourth inch apart. The bottom end of the tube 116 is sealed.

The vessel 100 is placed within the induction heating coils 124 of a suitable radio frequency heating unit so that the mandrel 114 within the chamber 106 is uniformly heated to a temperature of approximately 2,400°F. A gas containing both silicon and carbon as chemical constituents is supplied to the upper end of the tube 116 so that jets of gas are simultaneously emitted from the openings 120 along the entire length of the mandrel 114. This gas may be one of the organochlorosilane group, particularly an alkylchlorosilane, such as methytrichlorosilane or dimethyldichlorosilane, methyltrichlorosilane having been found to be particularly suitable. When the gas hits the heated graphite mandrel 114 it breaks down and silicon carbide is deposited on the heated surface of the mandrel 114 as it rotates within the chamber 106. In a specific embodiment, hydrogen is bubbled through liquid methyltrichlorosilane ($CH_3SiCl_3$) at a temperature of approximately 30°C., and the methyltrichlorosilane is carried as a gas with the hydrogen through a line to the top of the tube 116 which is heated to approximately 37°C. to prevent condensation of the methyltrichlorosilane before it reaches the chamber 106. A similar arrangement can be employed using liquid dimethyldichlorosilane ($(CH_3)_2SiCl_2$) under suitable conditions of temperature, and the like.

In accordance with an important feature of this aspect of the invention, the gas containing silicon and carbon is not simply introduced at a single point into the chamber 106 but instead is simultaneously introduced through all of the openings 120 spaced along the length of the rotating graphite mandrel 114. Accordingly, fresh gas containing both silicon and carbon and free from reaction products such as hydrogen chloride, is directed at the entire length of the rotating mandrel 114 and a coating of uniform chemical balance is thus formed on the mandrel 114 in the shape of the protective shell 50. In this connection it will be understood that the orifices 120 are positioned sufficiently close to the surface of the mandrel and the pressure of the gas jets issuing from these orifices is sufficiently great to insure that gas issuing from these orifices will strike the mandrel surface before it is sucked out of the chamber 106 by the continuously operating evacuation apparatus connected to the conduit 104a. In some instances, the tube 116 may be shaped to conform to the profile of the rotating mandrel to obtain uniform deposition along the length of the mandrel. In the illustrated embodiment the tube 116 was spaced from three-eighths inch to three-fourths inch away from the mandrel and the hydrogen was bubbled through liquid methyltrichlorosilane in a chamber operating at an absolute pressure of 20 inches of mercury. Deposition of this coating is continued until the desired thickness of the shell 50 is achieved. The graphite mandrel 114 is composed of a graphite having a coefficient of thermal expansion as close to that of silicon carbide as possible and is also made relatively thin so that the walls of the madrel can give slightly and not crack the silicon carbide shell formed on this mandrel in the manner described above. This cracking could occur if the mandrel 114 were solid since the graphite does not contract exactly as much as the silicon carbide upon cooling. For example, the mandrel 114 may have a diameter of one to two inches and a thickness of 0.060 inch and the silicon carbide shell formed on this mandrel may have a thickness of 0.1 inch.

After the silicon carbide shell has been formed on the mandrel 114, the mandrel and shell are removed from the chamber 106 and placed in a furnace operating at approximately 1,800°F. A small diameter tube is placed inside the mandrel 114 when it is in this furnace and air under pressure is forced out of this tube into the interior of the mandrel. This air combines with the carbon of the mandrel 114 to form carbon monoxide which is carried away. After 8 or 9 hours of such treatment the mandrel 114 is completely oxidized away leaving the silicon carbide shell which was formed on the mandrel, and, in the illustrated embodiment has the shape of the silicon carbide shell 50 shown in FIG. 1. In this connection it will be understood that other shapes of silicon carbide may be readily formed in accordance with the above-described method. For example, the rotating mandrel may have transverse slots extending entirely through the mandrel and silicon carbide can be deposited on the inside surfaces of these slots provided the jets issuing from the orifices 120 are strong enough to blow the gas through these slots.

It will also be understood that if the organochlorosilane gas is introduced into the chamber 106 at only one general location, the gas will decompose and become altered chemically as it passes over the areas of the heated mandrel closest to the entry point so that it is not the same gas when it reaches the farthest removed portions of the mandrel and veins or deposits of free carbon or free silicon may be deposited in these areas. However, by providing fresh gas along the entire length of the rotating mandrel 114, a silicon carbide shell of uniform chemical balance without veins of free carbon or silicon is provided. As pointed out above, the gas introduced into the upper end of the tube 116 is continually exhausted through the conduit 104a during the forming operation so that fresh gas is continuously available for all of the openings 120 along the length of the mandrel 114.

Since the portion of the tube 116 which contains the openings 120 is also located within the field of the RF heting coils 124, this portion of the tube 116 tends to heat up, which would undesirably raise the temperature of the gas introduced through the tube 116 and would tend to produce partial decomposition of the gas prior to entry into the chamber 106 and could possibly produce undesired interaction with the tube 116. To prevent this, cooling water is circulated through a U-shaped tube 126 one arm of the U-shaped tube 126 one arm of the U-shaped tube 126 being secured to the tube 116 in any suitable manner so as to carry heat away from this tube in the area of the heating coils 124. The other arm of the tube 126, which carries away the heated water is spaced from the tube 116 by an amount sufficient to prevent counterflow heat exchange between these elements. With such an arrangement, the temperature of the gas emitted from the openings 120 is relatively low and the gas does not tend to decompose or break down until it strikes the heated surface of the mandrel 114.

protect the joints thereof to said sleeve and said protective member from oxidation due to exposure to the atmosphere.

17. The combination of claim 16, wherein said glass seal is liquid at the operating temperature of the converter and is contained by an annular silicon carbide member secured to the upper end of said protective member in the vicinity of said joints.

* * * * *